United States Patent

Redl

[11] Patent Number: 5,813,761
[45] Date of Patent: Sep. 29, 1998

[54] AGITATOR PADDLE ROTOR FOR MASH KETTLES

[75] Inventor: Simon Redl, Reichertshausen, Germany

[73] Assignee: Anton Steinecker Maschinenfabrik GmbH, Freising, Germany

[21] Appl. No.: 739,678

[22] Filed: Oct. 29, 1996

[30] Foreign Application Priority Data

Oct. 30, 1995 [DE] Germany .................. 295 17 343.2

[51] Int. Cl.⁶ .................. C12C 7/06; B01F 7/20
[52] U.S. Cl. .................. 366/314; 366/330.3
[58] Field of Search .................. 366/64–67, 96–99, 366/102–104, 262–265, 270, 309, 312, 313, 314, 325.1, 325.92, 328.2, 328.3, 328.4, 330.1, 330.3; 99/277.2

[56] References Cited

U.S. PATENT DOCUMENTS

| | | | |
|---|---|---|---|
| 3,547,413 | 12/1970 | Nunlist | 99/277.2 X |
| 3,920,228 | 11/1975 | Klauk et al. | 366/314 X |
| 4,104,737 | 8/1978 | Brailsford | 366/65 |
| 4,544,281 | 10/1985 | Wilkinson | 366/330.1 |
| 4,842,126 | 6/1989 | McConnell | |
| 5,393,141 | 2/1995 | Bornemann | 366/314 X |

FOREIGN PATENT DOCUMENTS

| | | |
|---|---|---|
| 1 206 115 | 6/1986 | Canada . |
| 0 042 037 A2 | 12/1981 | European Pat. Off. . |
| 0 082 899 A1 | 7/1983 | European Pat. Off. . |
| 2203760 | 5/1974 | France . |
| 90 15 999.3 | 5/1991 | Germany . |
| 1558811 A | 4/1990 | U.S.S.R. . |

Primary Examiner—Charles E. Cooley
Attorney, Agent, or Firm—Seed and Berry LLP

[57] ABSTRACT

An agitator paddle rotor for mash kettles in brewing, the rotor being rotatingly arranged above the bottom of the mash kettle, comprising at least two radially extending agitator paddles of which each comprises at least one obliquely oriented paddle section. To obtain an effective thorough mixing, at least one paddle section has a front paddle portion which is the front one in rotational direction and which substantially ends in parallel with the bottom of the mash kettle, an upwardly oriented central paddle portion, and a rear paddle portion which is the rear one in rotational direction and is substantially oriented in parallel with the bottom of the mash kettle.

9 Claims, 5 Drawing Sheets

AGITATOR PADDLE ROTOR FOR MASH KETTLES

TECHNICAL FIELD

The present invention relates to an agitator paddle rotor for mash kettles for use in brewing, the rotor being rotatingly arranged above the bottom of the mash kettle and comprising at least two radially extending agitator paddles, of which each comprises at least one obliquely oriented paddle section.

Such agitator paddle rotors are used in mash kettles, such as mash tuns or mash coppers, in brewing. During the mashing process the stored mash is thoroughly mixed with the aid of the agitator paddle rotor by the rotor being rotatingly driven by a motor which is arranged outside of the mash kettle. The agitator paddle rotor is arranged near the bottom of the mash kettle.

BACKGROUND OF THE INVENTION

According to the prior art (see, e.g., Steinecker brochure 3/95 "Maischgefäβe" ("Mash Kettles")), the individual agitator paddle sections of the agitator paddle rotor are obliquely mounted on the shaft of the rotor to mix the mash thoroughly and in an improved manner. The cross section of such a paddle section has about the shape of a quarter of a circle. In the paddle section area near the shaft the approximate quarter circle is arranged such that its concave side is forwardly oriented in the rotational direction of the rotor, thereby deflecting the mash downwardly upon rotational movement. Such an arrangement requires a spaced-apart arrangement of the agitator paddle rotor relative to the bottom of the mash kettle, since otherwise the mash would accumulate below the paddle section. Especially when thick mash is subjected to a mashing process, there will be no satisfactory thorough mixing in the middle of the mash kettle. Especially in the portions of the paddle sections having a major radial distance from the shaft of the agitator paddle rotor, a high load will be created produced by the agitator paddle which has substantially the shape of a quarter circle if the agitator paddle rotor moves through the mash.

The cross section of the paddle section which is substantially in the form of a quarter circle has the effect that the portion of the paddle section which is the rear one in rotational direction is substantially oriented towards the bottom of the mash kettle and thus oriented in a direction perpendicular to the motional direction of the rotor. Upon movement of the rotor through the mash this might create tear-off swirls at the rear end of the paddle section and spouts at the rotor shaft that are harmful to the mash. Moreover, the end of the paddle section that is oriented towards the bottom of the mash kettle exerts a great pressure on the mash, so that the mash is more and more exposed to shear forces that might be harmful to the mash and increase the viscosity thereof, which might lead to lautering problems in the subsequent lautering process.

SUMMARY OF THE INVENTION

It is therefore the object of the present invention to provide an agitator paddle rotor of the above-mentioned type which permits an effective and nevertheless gentle thorough mixing of the mash and is of a simple constructional structure.

This object is achieved in that the at least one paddle section comprises a paddle portion which is the front one in the rotational direction of the agitator paddle and ends substantially in parallel with the bottom of the mash kettle, a central paddle portion which is steeper than the front paddle portion and is oriented upwardly, and a paddle portion which is the rear one in rotational direction and oriented substantially in parallel with the bottom of the mash kettle.

The paddle portion which is the front one in rotational direction ensures that the mash is gently lifted from the bottom, the central paddle portion guides the mash upwards and the paddle section which is the rear one in rotational direction ensures an approximately swirl-free removal of the mash from the paddle section.

There are no mash accumulations below the agitator paddle, since the mash is moved upwards by the paddle sections. The agitator paddle rotor which is formed in accordance with the invention can therefore rotate near the mash kettle bottom, ensuring an effective thorough mixing of the mash. Since the rear portion of the paddle section which ends substantially in parallel with the bottom of the mash kettle virtually forms no swirls, the mash is gently stirred. Increased shear forces are also not created in the outer area of the agitator paddle. Hence, the mash is not subjected to any forces that might be harmful to it or cause an undesired increase in its viscosity. The paddle sections of the agitator paddle rotor of the invention can e.g. be made by simply bending corresponding sheet metals.

In an advantageous embodiment of the invention the cross-sections of the paddle sections have the shape of an extended Z or an extended S.

Advantageously, each of the agitator paddles is equipped with at least two spaced-apart superimposed paddle sections. Such an arrangement effects an improved thorough mixing and improved guidance of the mash when the agitator paddles move through the mash.

In another design the front edges of the front sections of the increased paddle sections are arranged to be forwardly offset in the rotational direction of the agitator paddle rotor to enhance the mixing process.

Each agitator paddle advantageously comprises at least one vertically oriented distributor plate in addition. Such distributor plates increase the stability of the agitator paddles and improve the stirring process for the mash.

It is also of advantage when the vertical distributor plates are oriented in a direction oblique to the radial direction of the agitator paddle rotor, so that an additional radial force acts on the mash during the rotational movement of the agitator paddle rotor.

The vertical distributor plates are advantageously oriented in an oblique direction such that the portion which is the front one in the rotational direction of the agitator paddle rotor is arranged closer to the rotor shaft than the portion that is the rear one in the rotational direction of the agitator paddle rotor. During movement of the agitator paddle rotor through the mash such a vertical distributor plate exerts a radial, outwardly oriented force on the mash, so that there will be no mash accumulations in the center of the mash kettle.

Furthermore, it is advantageous when the vertical distributor plates are arranged between the agitator sections whenever a plurality of agitator sections are superimposed. Furthermore, this arrangement improves the stability of the agitator paddles and the thorough mixing of the mash during movement of the agitator paddle rotor through the mash.

In another advantageous development the individual edges of the agitator sections are beveled, so that upon movement of the agitator sections through the mash no vertical edges present an obstacle to the mash and subject the mash to such undesired strong forces.

The agitator sections are advantageously inclined to the rotor shaft such that their outer ends are at a higher level than their area near the shaft, whereby the rotor is adapted to the shape of the mash kettle. It is only in the case of a plane kettle bottom that a right angle exists between the agitator paddles and the axial direction. Hence, the agitator paddles move over their whole length in direct vicinity of the kettle bottom of the mash.

BRIEF DESCRIPTION OF THE DRAWINGS

The present invention shall now be explained in more detail with reference to the drawings, in which.

DETAILED DESCRIPTION OF THE INVENTION

Figure 1:
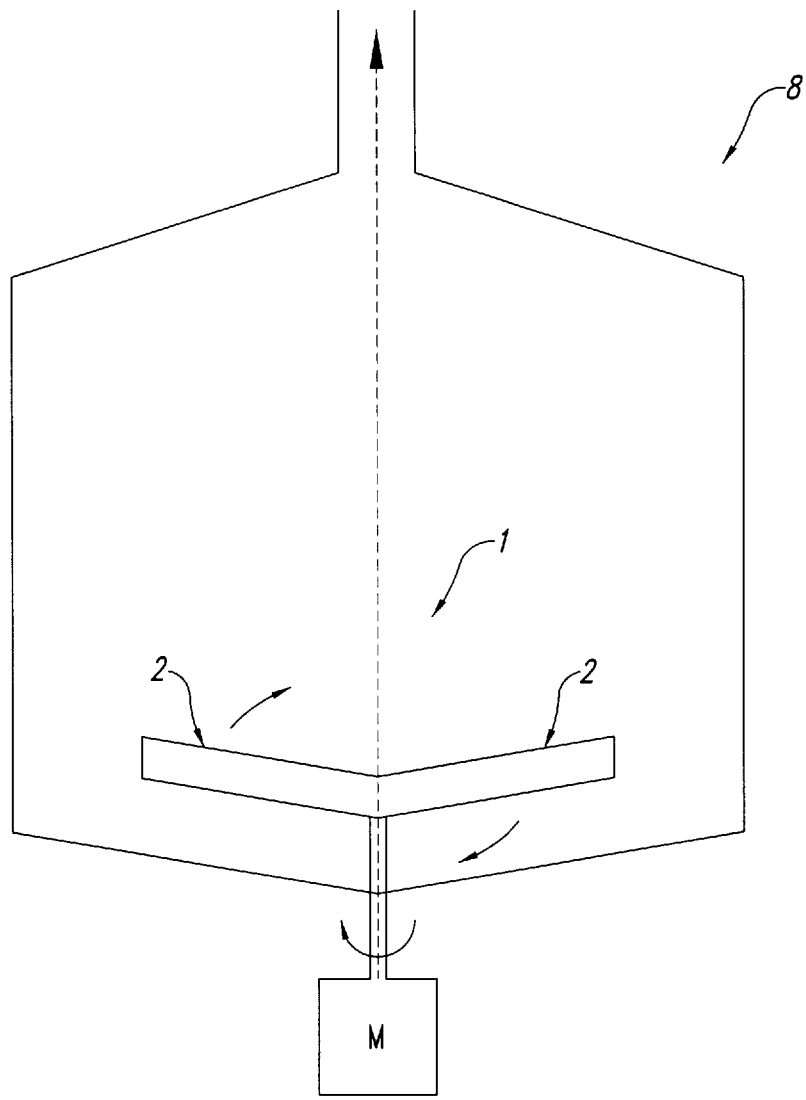
FIG. 1 diagrammatically illustrates a mash kettle comprising an agitator paddle rotor.

FIG. 1 diagrammatically shows a mash kettle 8, e.g. a mash tun or a mash copper, as are used in brewing. An agitator paddle rotor 1 which is driven by a motor M outside the mash kettle moves on the bottom of kettle 8. The agitator paddle rotor 1 comprises individual agitator paddles 2 which thoroughly mix the mash.

Figure 2:
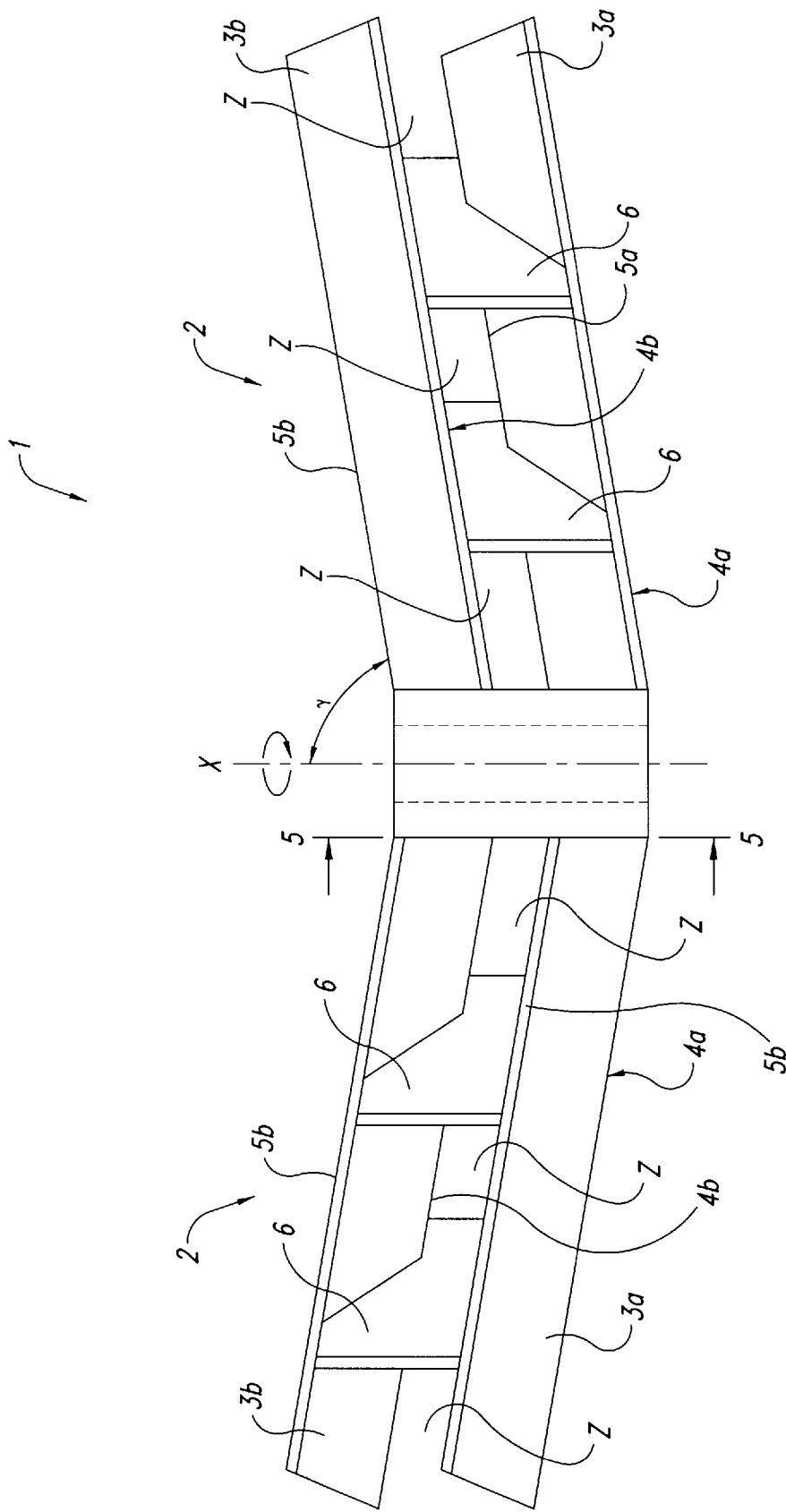
FIG. 2 is a lateral view of an agitator paddle rotor according to the invention.
Figure 4:
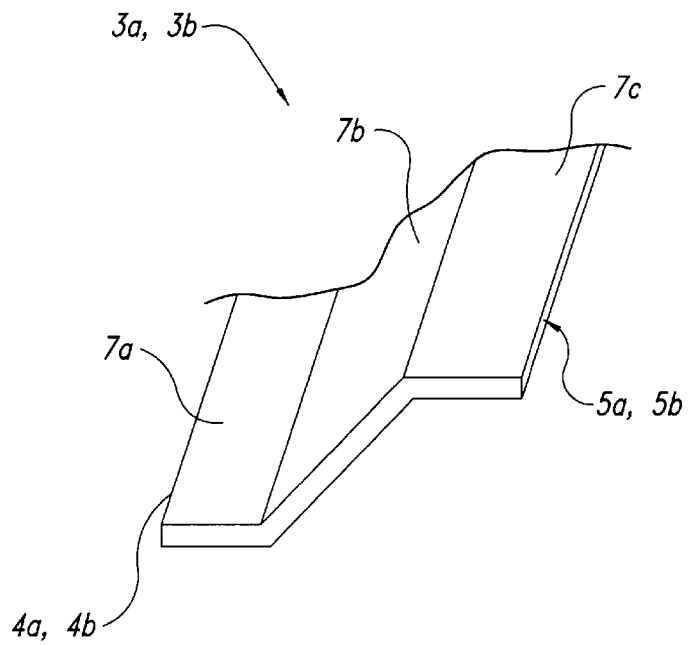
FIG. 4 is a perspective view of part of an agitator paddle section according to the invention.
Figure 5:
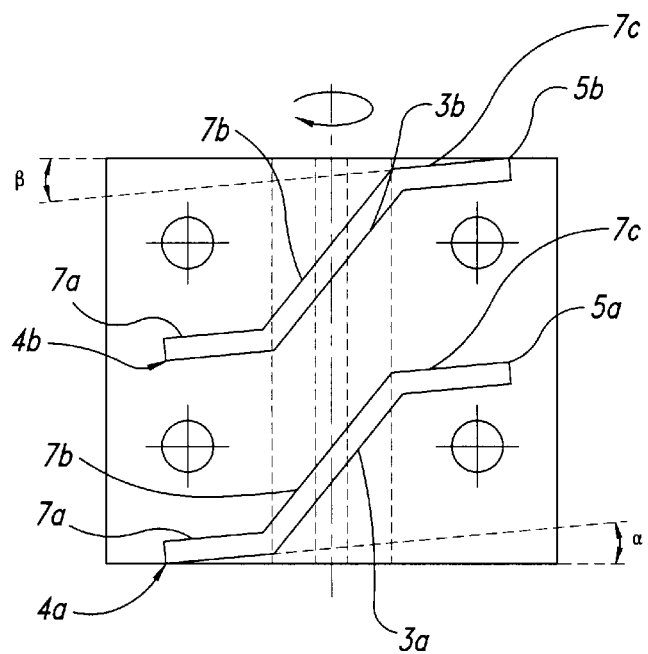
FIG. 5 is a view taken in the direction of arrow 5—5 of FIG. 2.

FIG. 2 shows an agitator paddle rotor 1 in accordance with a preferred embodiment of the present invention. The rotor is rotated about a shaft X. The individual agitator paddles 2 form an angle γ with shaft X, the angle γ following from the geometry of the bottom of the mash kettle in such a manner that the agitator paddles rotate over their whole length as close as possible to the bottom of the mash kettle 8. With a plane mash kettle bottom, angle γ is therefore 90°. If the bottom of the kettle slopes towards the shaft, as is often the case with mash kettles, angle γ will correspond to the slope of the kettle bottom. According to the preferred embodiment an agitator paddle 2 consists of two agitator paddle sections 3a and 3b that have a cross-section as shown in FIG. 4. Each of the agitator sections consists of front, central and rear paddle portions 7a, 7b, 7c when viewed in rotational direction, the portions 7a, 7b, 7c representing an extended Z in cross-sectional view. As shown in FIG. 5, the front portion 7a is inclined by the angle α towards the mash kettle bottom, which angle α may be a small angle in the order of 5°. The front paddle portion 7a will effect a careful lifting of the mash from the mash bottom before the steeper central paddle portion 7b moves the mash upwards while the agitator paddle continues its movement through the mash. The rear portion 7c of a paddle section, which is rather flat again, effects an approximately swirl-free removal of the mash from the agitator paddle section. The rear portion 7c of the agitator paddle sections is inclined by an angle β relative to the horizontal, which angle β may again be a small angle in the order of 5°. The edges 4a, 4b, 5a, 5b are additionally beveled, so that no vertical edges will impinge on the mash during movement of the agitator paddle through the mash. These measures effect a gentle thorough mixing of the mash without the creation of any undesired great shear forces. Since the paddle portion 7a which is the front one in rotational direction is arranged over the whole length of the agitator paddle 2 to end almost in parallel with the mash kettle bottom and since the mash is lifted upwards by the agitator paddle sections 3a, 3b, the agitator paddle rotor 1 can be arranged very close to the mash kettle bottom, whereby an effective thorough mixing is made possible. In contrast to the prior art, the occurrence of accumulations below the agitator paddle sections is ruled out.

Figure 3:
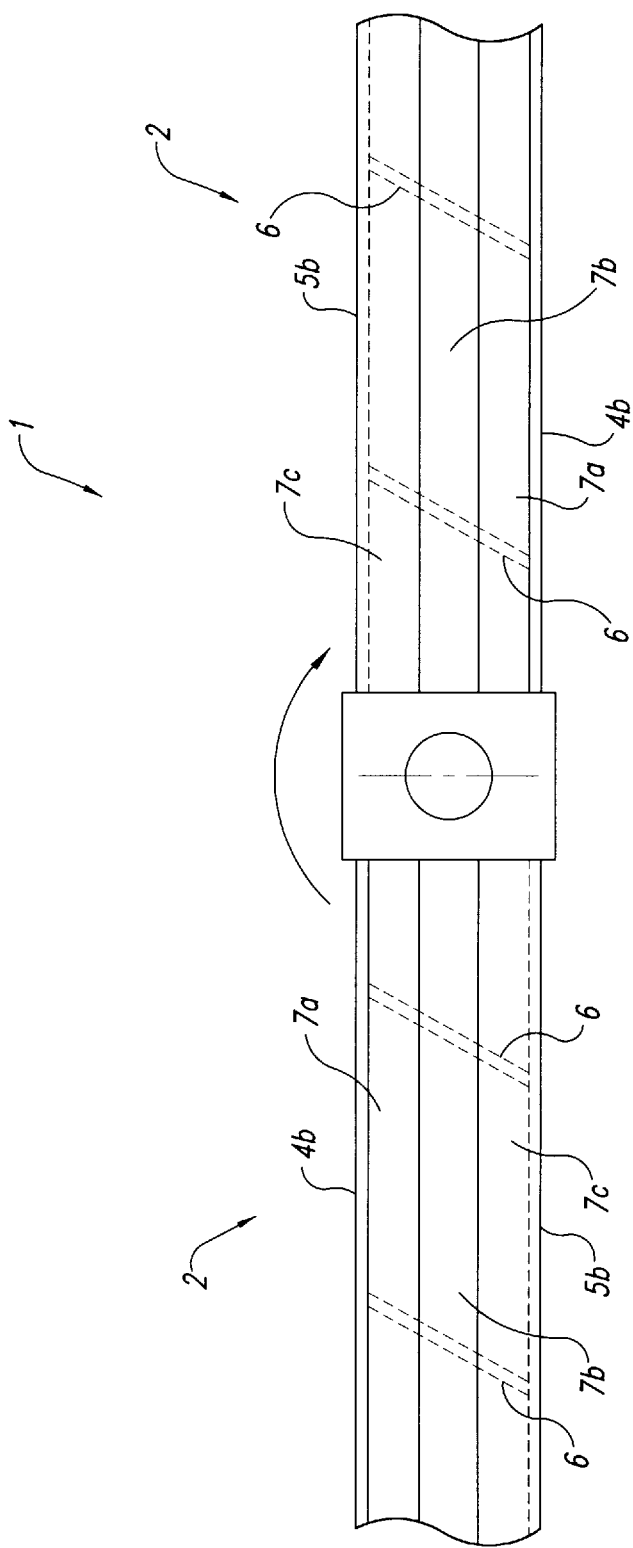
FIG. 3 is a top view of the agitator paddle rotor of FIG. 2.

As can further be seen in FIG. 2, the preferred embodiment has two vertically aligned distributor plates 6 per agitator paddle 2, the distributor plates 6 being obliquely oriented in motional direction, as shown in FIG. 3. Upon movement of the agitator paddle rotor 1 these oblique, vertically oriented distributor plates 6 effect a radial force acting on the mash, which enhances the mixing process and prevents accumulations in the center of the mash kettle. Moreover, the mutual stability of the lower and upper paddle sections 3a and 3b is increased.

Figure 6:
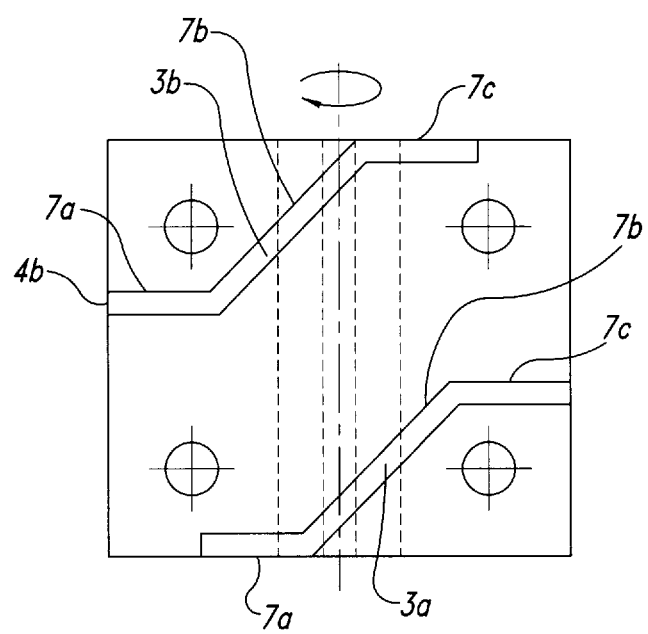
FIG. 6 is a view similar to FIG. 5 of another embodiment of the assembly of two superimposed paddle sections.

FIG. 5 shows a possible arrangement of two superimposed agitator paddle sections 3a and 3b, in accordance with a section A—A in FIG. 2. Another possible arrangement of superimposed agitator paddle sections is shown in FIG. 6, in which the upper paddle section 3b is additionally offset forwardly as compared to the lower paddle section 3a, so that the front edge 4b of the front portion of the upper paddle section 3b is offset forwardly in rotational direction to optimize mash guidance.

During the rotating operation of the agitator paddle rotor the mash passes through the spaces Z which are formed by the upper and lower paddle sections 3b and 3a and the vertical distributor plates 6. The mash is carefully lifted by the front paddle portion 7a and moved upwardly by the central paddle portions 7b before being removed approximately without any swirls from the rear paddle portion 7c.

I claim:

1. An agitator paddle rotor for mash kettles for use in brewing, said rotor being rotatingly arranged above the bottom of said mash kettle and comprising at least two radially extending agitator paddles, of which each comprises at least one obliquely oriented paddle section relative to a direction of rotation of said rotor, at least one of said paddle sections comprises a front paddle portion which is the front one in rotational direction and ends substantially in parallel with the bottom of said mesh kettle, and upwardly oriented central paddle portion which is connected to the front paddle portion and is steeper than the front paddle portion, as well as a rear paddle portion which is connected to the central paddle portion and is the rear one in the rotational direction and oriented substantially parallel with the bottom of said mash kettle, the at least one paddle section has opposing first and second ends, and each agitator paddle includes at least one vertical distributor plate connected to the at least one paddle section at a position between the first and second ends.

2. The agitator paddle rotor according to claim 1 wherein the at least one paddle section has the shape of an extended Z or S when viewed in cross section.

3. The agitator paddle rotor according to any of the preceding claims, wherein the at least one paddle section is a first paddle section, and each agitator paddle comprises at least a second paddle section that is arranged in a spaced-apart superimposed relationship with the first paddle section and below the second paddle section.

4. The agitator paddle rotor according to claim 3, wherein the front paddle portions of the first paddle section have front edges which are disposed in forwardly offset fashion in the rotational direction of said agitator paddle rotor relative to front edges on the front paddle portions of the second paddle section.

5. The agitator paddle rotor according to claim 3 wherein said vertical distributor plates are arranged between said superimposed first and second paddle sections.

6. The agitator paddle rotor according to claim 1, wherein said at least one vertical distributor plate comprises a plurality of vertical distributor plates which are obliquely oriented relative to the radial direction of said agitator paddle rotor.

7. The agitator paddle rotor according to claim 1 wherein said at least one vertical distributor plate comprises a plurality of vertical distributor plates which are obliquely oriented such that a front part of said vertical distributor plates which is the front one in the rotational direction of said agitator paddle rotor is arranged closer to a rotary shaft of said agitator paddle rotor than a rear part of said vertical distributor plates that is the rear one in the rotational direction of said agitator paddle rotor.

8. The agitator paddle rotor according to claim 3 wherein said at least one vertical distributor plate comprises a plurality of vertical distributor plates which are arranged between said superimposed first and second paddle sections.

9. The agitator paddle rotor according to claim 1 wherein at least one of said agitator paddles is mounted in upwardly inclined fashion on a shaft of said agitator paddle rotor.

* * * * *